Patented Aug. 30, 1949

UNITED STATES PATENT OFFICE 2,480,560

METHOD FOR PYROLYZING POLYFLUOROALKANES

Frederick B. Downing, Carney's Point, and Anthony F. Benning and Robert C. McHarness, Woodstown, N. J., assignors to Kinetic Chemicals, Inc., Wilmington, Del., a corporation of Delaware No Drawing. Application December 6, 1945, Serial No. 633,264

3 Claims. (Cl. 260—653)

This is a continuation-in-part of our earlier filed applications Serial No. 435,064, now Patent No. 2,387,247, and Serial No. 475,526 filed February 11, 1943, now abandoned.

This invention relates to the preparation of organic fluorine compounds by pyrolysis. By pyrolysis, we mean the transformation of a compound into another substance or other substances through the agency of heat alone. (Hurd, The Pyrolysis of Carbon Compounds, p. 9.) The term "pyrolysis" used in this specification therefore will include not only the decomposition of compounds but also the making of more complex compounds. In the applications identified as Benning et al., Serial No. 344,666, filed July 10, 1940, now Patent No. 2,365,516, and Benning, Serial No. 379,473, filed February 18, 1941, now Patent No. 2,343,252, are disclosed two processes involving a reaction between a fluoro-hydrocarbon and HCl in the presence of a catalyst. Those reactions may be described as additive, since their apparent course is the addition of HCl to the olefine in the place of double bonds. These reactions were carried out at comparatively low temperatures, in most cases below 350° C., because those temperatures were satisfactory and because observations of a limited number of experiments at higher temperatures showed the existence of what were thought to be undesirable side reactions. We have now discovered that the side reactions are pyrolytic and of a fundamentally different nature than HCl addition, and that they and other reactions that occur at elevated temperatures can be put to valuable use.

It is an object of this invention to produce organic compounds by pyrolysis. Another object of the invention is to produce compounds which are useful, by methods which are economically and technically satisfactory. Another object of the invention is to produce new fluoro hydrocarbons. A particular object of the invention is to synthesize fluoroalkenes by the pyrolysis of polyfluoroalkanes. Another object of the invention is to produce the compound $CH_2=CF_2$ by methods which are technically and economically satisfactory.

According to our invention polyfluoroalkanes, which may otherwise be called polyfluoro aliphatic compounds consisting of carbon, hydrogen and fluorine, are made into other compounds by pyrolysis. This reaction may be carried out in isolation, or in the presence of a "catalyst," by which we mean a substance that affects the result without combining with the reactants. Inert gases such as nitrogen and helium may be present as diluents or buffers..

The fluoroalkanes, which may be pyrolyzed in accordance with our invention, include 1,1,1-trifluoroethane and its homologs; 1,1-difluoroethane and its homologs; 1,1,2-trifluoroethane and its homologs; 1,1,1,2-tetrafluoroethane and its homologs; 1,1,2,2-tetrafluoroethane and its homologs, pentafluorethane and its homologs; hexafluoroalkanes of 3 to 5 carbon atoms and other fluoroalkanes containing one or more —$CF_2$— groups with at least one hydrogen on a carbon adjacent to a —$CF_2$— group.

The compounds of the formula $H(CF_2)_nF$ wherein $n$ is an integer of at least 3, including $H(CF_2)_5F$, may be prepared by fluorinating compounds of the formula $H(CF_2)_nCl$ with $SbF_5$ in a closed vessel at temperatures of from about 175° C. to about 250° C. as disclosed in the joint application of Anthony F. Benning and Joseph D. Park, Serial No. 603,258, filed July 4, 1945, now abandoned.

As a starting material we prefer to use a polyfluoroalkane of from 2 to 5 carbon atoms having at least two fluorine atoms on at least one carbon atom and at least one hydrogen atom on an adjacent carbon atom, that is, on a carbon atom adjacent to a carbon atom carrying at least two fluorine atoms. Differences have been observed in the effect of pyrolysis on saturated and unsaturated compounds.

In the pyrolysis of the polyfluoroalkanes, the reaction appears to involve primarily an intramolecular dehydrofluorination, wherein both elements of the hydrogen fluoride are obtained from the same molecule, to produce fluoro-olefines which have a tendency to polymerize. For example, the pyrolysis of $CH_3CF_3$ produces primarily $CH_2=CF_2$ and

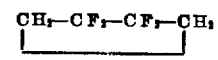

Although for the production of particular compounds the reaction will be carried out under well-controlled conditions of time, temperature and pressure, complex mixtures of compounds of various molecular weights can be produced by subjecting the compounds to pyrolytic conditions for extended periods of time. Pressures may also be used to vary the results, although for the purposes of economy and safety each particular reaction should be carried out with the lowest pressure consistent with optimum results. For example, pressures of four atmospheres absolute have been found satisfactory in many cases. In general, operations may be carried out at pressures between 0.1 and 10 atmospheres absolute, but other pressures are useful and may be employed when an increase in efficiency will result.

This is a pyrolytic process. The disintegration and integration are produced essentially by heat. It is, therefore, important to select a temperature which will efficiently produce the reaction. The temperature should be selected to give optimum production of the desired product. We have found that excellent pyrolytic results have been produced at temperatures between 600° and 1000° C., but that particular substances have been pyrolyzed at temperatures as low as 400° C. and above 1000° C. under appropriate conditions of time and pressure. Electrical heating is efficient, but any method of heating may be applied. The temperatures which are used must also be chosen in view of the materials that compose the reaction apparatus.

The time of exposure of the reactants to the pyrolytic conditions is a matter of considerable importance where a particular product is desired. Extending the period of exposure frequently produces compounds of increased molecular weight.

In general, the pyrolysis proceeds to the integration of new fluoro hydrocarbons efficiently in the absence of catalysts. Heavy metal halides, such as those of iron, copper and nickel, and halides of the alkaline earth metals, such as $BaCl_2$ and $CaCl_2$ may be used.

The process is preferably carried out continuously by passing the convertible material through a tube heated to a pyrolytically effective temperature. The tube should be composed of a material which is inert to the reaction and the reaction products. Carbon and the noble metals are sufficiently inert and have proved to be satisfactory materials for the construction of reaction chambers. The chamber need not be wholly composed of the inert material, but may be lined with it. Reaction chambers containing a platinum lining are particularly satisfactory. The process may be carried out in batches rather than continuously, but continuity is preferred.

The following examples have been carried out and have been selected for inclusion in this specification because they show a number of the compounds which have been successfully pyrolyzed, and a number of classes thereof, and a variety of reaction conditions. The applicants present these examples, not as constituting any limitation of the work which has actually been done, but as sufficiently representative to enable persons skilled in the art to practice the invention. In these examples the terms "conversion" and "amount converted" include the assumption that the disappearance of one mol of the primary organic material resulted in the liberation of one mol of halogen acid. This assumption is warranted by the close agreement between the figures for conversion obtained by acid analysis and the actual primary material which disappeared. Unless otherwise noted, the examples were carried out at a pressure of about one atmosphere. The temperatures of the pyrolyses were measured with a thermocouple which was placed in contact with the outer surface of the reaction tube near the center of the heated zone, so that the true average temperature of the gases in the tube may have been somewhat lower than the values given.

*Example I*

$CH_3CF_3$ was passed through a nickel jacketed carbon tube, 18.8 mm. I. D. x 600 mm. long, at the rate of about 58 g./hr. During this time, the temperature was raised from 750° C. to 910° C. The reaction products were washed with water, dried and condensed in receivers cooled to about —70° C. Acid analysis showed a 21% conversion at 800° C. and a 113% conversion at 910° C. The mixture of products obtained from the pyrolysis had a boiling range of between —65° C. and +79° C. The $CH_3CF_3$ had a boiling point of —46.8° C.

*Example II*

$CH_3CF_3$ was passed through a platinum-lined Inconel jacketed nickel tube, 19 mm. I. D. x 60" long, at a rate of about 24 g. per hour at a tube temperature maintained at about 820° C. The reaction products were washed with water, dried and condensed in receivers cooled in a carbonice-acetone bath followed by a receiver cooled in liquid nitrogen. The compounds obtained in this pyrolysis, were the same as those obtained in Example I. Material, condensed in the liquid nitrogen receiver, was isolated and identified as $CH_2=CF_2$, boiling at —82° C. and constituted part of the $CH_2=CF_2$ formed. Some $CH_2=CF_2$ was present in the mixture condensed in the carbonice-acetone receivers. A fraction of the material condensed in the carbonice-acetone receivers boiled at 50° C. and was identified as tetrafluorocyclobutane having the formula

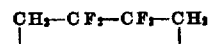

*Example III*

About 7 g. per hour of $CH_2=CF_2$ (B. P. —82°) was passed through a platinum-lined tube heated to 780° C. Some carbonization and tar formation took place. The crude organic reaction products were washed free of acid, dried and condensed. The boiling range of this condensate was from —85° to +83° with definite fractions boiling at —42° C., +50° C. and 83° C. The compound boiling at +50° C. has the formula

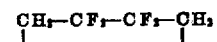

*Example IV*

During a period of 6 hours, a total of 100 parts of 1,1-difluoroethane was passed through a silver-lined steel tube 0.6 inch I. D., and 54 inches long heated to 690–764 C. in a 3 ft. electric furnace. The off-gases were scrubbed with water, passed over soda and lime, dried over calcium chloride and the product was collected in a solid carbon dioxide-acetone cooled trap, backed up with a liquid nitrogen cooled trap. At the conclusion of the pyrolysis, the water scrubber gave a positive test for fluorine and was acidic. Titration indicated that 6.4 parts of hydrogen fluoride had been formed in the reaction. Distillation of the organic product collected in the solid carbon dioxide-acetone cooled trap gave the following results:

| | Parts |
|---|---|
| Fraction 1—Boiling point —69° to —27° C. | 4 |
| Fraction 2—Boiling point —27° to —17° C. | 51 |
| Fraction 3—Boiling point —17° to —11° C. | 9 |

The lowest boiling fraction contained crude vinyl fluoride which boils at —72° C. when rigorously refined.

*Example V*

Over a period of 20 minutes, a total of 217 parts of 1,1-difluoroethane was bled through a 1 in. diameter Inconel pipe heated to 562–797° C. over a 10 in. length by means of an electric furnace. After removal of the hydrogen fluoride by condensation in an ice trap followed by scrubbing of the effluent gases with soda and lime, and after removal of acetylene with aqueous silver nitrate solution, the gaseous product was condensed and collected in a solid carbon dioxide-acetone cooled trap. Distillation of the trapped material gave 48.6 parts of vinyl fluoride (B. P. —70° to —62° C.), 24.4 parts of intermediate material (B. P.

−62° to −30° C., a mixture of vinyl fluoride and unreacted 1,1-difluoroethane), and 82 parts of unchanged 1,1-difluoroethane. This represents a yield of 71%, and a conversion of 40% based on the 1,1-difluoroethane charged.

Example VI 2,2-difluorobutane (30 parts) was passed through an Inconel tube heated to 660° ± 8° C. over a period of 45 minutes, corresponding to a contact time of 1.6 seconds. The pyrolysis products were passed over soda and lime to remove hydrogen fluoride and were condensed in a carbon dioxide ice-acetone cooled trap. Distillation of the trapped material gave 8 parts of 2-fluorobutene boiling at 20° C. to 27° C. and having a refractive index of $n_D^{10}$, 1.3302. The residue, comprising 20 parts, had a refractive index of $n_D^{10}$, 1.3220 indicating it was unchanged 2,2-difluorobutane.

The 2-fluorobutene was converted to the fluorodibromobutane by reaction with bromine in carbon tetrachloride. The following analytical results on the dibromide (B. P. 155°–162° C.) were obtained.

|   | Molar Refraction | Per Cent Fluorine | Per Cent Bromine |
|---|---|---|---|
| Calc'd. for $C_4H_7FBr_2$ | 36.12 | 8.1 | 67.8 |
| Found | 36.29 | 8.3, 8.2 |   |

Example VII $H(CF_2)_5F$ was passed through a platinum-lined Inconel jacketed nickel tube 8 mm. I. D. x 16" long at a rate of about 19–20 g. per hour. The surface temperature was maintained at about 830°–850° C. over an estimated length of 8" by electrical heating. The organic material was fed liquid phase into the pyrolysis tube through a calibrated pipette. The effluent reaction products were washed with water, dried and condensed in receivers, cooled in carbonice-acetone, followed by a tailing receiver cooled in liquid nitrogen. About 25 g. of condensate was collected in the carbonice-acetone trap with 1.35 g. of material in the liquid nitrogen receiver. An additional 1.5 g. of "high boilers" unindentified) were separated from the wash water. An analysis of the wash water showed the presence of 0.9 g. of HF. The liquid nitrogen condensate was found to be $C_2F_4$ and had a boiling point of −76° C. and a molecular weight of 99 (calculated for $C_2F_4$: molecular weight is 100). The carbonice-acetone condensate was distilled on the Podbielniak column and found to contain the following fractions:

| Boiling Range, °C. | Compound | Molecular Weight | |
|---|---|---|---|
|   |   | Calculated | Found [1] |
| (1) −85 to −77 | $C_2F_4$ | 100 | 104.4 |
| (2) −77 to −65 | Unidentified |   |   |
| (3) −65 to −37 | do |   |   |
| (4) −37 to −33 | do |   |   |
| (5) −33 to −31 | do |   | 169 |
| (6) −28 | $CF_3CF=CF_2$ | 150 | 148 |
| (7) −20 to −16 | $C_3HF_5$ | 130 | 132 |
| (8) +7 | $C_4F_8$ | 200 | 203 |

[1] Assumes PV=RT which for a compound of this type gives a molecular weight from 2 to 4% high.

The largest fraction was fraction (6). The olefinic nature of fractions (1), (6), (7) and (8) was demonstrated by the fact that they reduced aqueous-alcoholic $KMnO_4$ solution. Fraction (8) most probably has the structure $CF_3-CF_2-CF=CF_2$ and is shown not to be cyclic since it reacts with permanganate and because it boils 12° higher than the known cyclic compound.

Example VIII $CF_2CH_2CH_3$ was pyrolyzed in a platinum-lined tube similar to that described in Example VII. At a tube temperature of 830–850° C., about 35 g. of organic material was fed through the tube in the course of two hours. The reaction products were washed with water, dried over calcium sulfate and condensed in receivers cooled in a carbonice-acetone bath, followed by a tailing receiver cooled in liquid nitrogen. Analysis of the wash water showed about 3 g. of HF.

About 25 g. of material was condensed in the carbonice-acetone trap and about 8 g. of material in the liquid nitrogen trap. These two condensates were placed in the Podbielniak still and fractionally distilled. The following fractions were identified:

| Boiling Range, °C. | Compound | Molecular Weight | |
|---|---|---|---|
|   |   | Calculated | Found [1] |
| (1) −103 to −102 | $CH_2=CH_2$ | 28 | 28.4 |
| (2) −85 to −83 | $CF_2=CH_2$ | 64 | 65.3 |
| (3) −73 to −72 | $CHF=CH_2$ | 46 | 46.2 |
| (4) −29 to −27 | $CF_2=CHCH_3$ | 78 | 81. |
| (5) −16 to −14 | $CF_2CH_2-CH_3$ | 96 | 97.5 |

[1] Assumes PV=RT which for a compound of this type gives a molecular weight from 2 to 4% high.
The main constituent in the product was $CF_2=CH-CH_3$.

The reaction products may be washed with water or alkaline solution to remove acid constituents before condensation and analysis, although this is not necessary. In some cases, it is advantageous to separate certain desired components before acid removal.

The particular advantage of the invention is that a pyrolytic process has been discovered for the production of new compounds and for the more efficient production of old compounds, which is characterized by its simplicity and the ease with which it may be operated. The invention provides an efficient method of producing organic compounds containing fluorine, particularly fluorinated olefines. These compounds have uses in themselves, such as for refrigerants, anaesthetics, and solvents and are useful as intermediates for the production of alcohol, esters, halides, and alkyl derivatives. A particular advantage of the invention is that the process is most efficient for the production of the valuable compounds $CH_2=CF_2$ and $CF_2=CH-CH_3$, which are intermediates of wide utility, particularly for refrigerants and plastics. The invention is also useful for the synthesis of compounds having more carbon atoms than the compound pyrolyzed, and for the extension of carbon chains. The process involves the pyrolysis of compounds of both light and heavy molecular weight. The pyrolysis has been carried out in both a continuous and a step-wise manner, and a large variety of conditions has been employed, so that it is beyond question that the process is of general application.

As many apparently widely different embodiments of this invention may be made without departing from the spirit and scope thereof, it is to be understood that we do not limit ourselves to the specific embodiments thereof except as defined in the appended claims.

We claim:
1. The process which comprises pyrolyzing at a temperature of from about 600° C. to about 1000° C. a polyfluoroalkane consisting of the elements carbon, hydrogen and fluorine, from 2 to 5 carbon atoms, at least 2 fluorine atoms on at least one carbon atom and at least one hydrogen on an adjacent carbon atom, all carbons carrying a single fluorine atom being adjacent a carbon carrying at least 2 fluorine atoms.

2. The process which comprises pyrolyzing a trifluoroethane consisting of the elements carbon, hydrogen and fluorine at a temperature of from about 600° C. to about 1000° C.

3. The process which comprises pyrolyzing $CH_3CF_3$ at a temperature of from about 600° C. to about 1000° C.

FREDERICK B. DOWNING.
ANTHONY F. BENNING.
ROBERT C. McHARNESS.

REFERENCES CITED

The following references are of record in the file of this patent:

UNITED STATES PATENTS

| Number | Name | Date |
|---|---|---|
| 1,986,876 | Baxter et al. | Jan. 8, 1935 |
| 2,378,859 | Mugdan et al. | June 19, 1945 |
| 2,379,372 | Mugdan et al. | June 26, 1945 |

OTHER REFERENCES

Senderens, "Bull. Soc. Chim. de France," 4th series, vol. 3, pages 823–829 (1903).

Gilman, "Organic Chemistry" (2nd ed., 1943), vol. I, pages 956–957.